United States Patent [19]

Nagasato et al.

[11] Patent Number: 5,812,517
[45] Date of Patent: Sep. 22, 1998

[54] OPTICAL HEAD DRIVER

[75] Inventors: Makoto Nagasato, Yokohama; Takahiro Kokubo, Fujisawa, both of Japan

[73] Assignee: Kabushiki Kaisha Toshiba, Kawasaki, Japan

[21] Appl. No.: 639,305

[22] Filed: Apr. 25, 1996

[30] Foreign Application Priority Data

Apr. 28, 1995 [JP] Japan .................................. 7-106580
Mar. 15, 1996 [JP] Japan .................................. 8-059787

[51] Int. Cl.⁶ .................................................. G11B 21/02
[52] U.S. Cl. .................................................. 369/219
[58] Field of Search ................................. 369/215, 219, 369/247, 258, 44.15, 44.16; 360/106

[56] References Cited

U.S. PATENT DOCUMENTS

| | | | |
|---|---|---|---|
| 4,862,441 | 8/1989 | Yumura et al. | 369/45 |
| 4,868,696 | 9/1989 | Hammer et al. | 360/106 |
| 5,463,612 | 10/1995 | Date | 369/219 |
| 5,590,007 | 12/1996 | Yanagawa et al. | 360/109 |

FOREIGN PATENT DOCUMENTS 5-166212   7/1993   Japan .

*Primary Examiner*—Stuart S. Levy
*Assistant Examiner*—George J. Letscher
*Attorney, Agent, or Firm*—Cushman Darby & Cushman IP Group of Pillsbury Madison & Sutro

[57] ABSTRACT

An optical head drive device for driving an optical head in a tracking direction and a focusing direction, comprising a pair of first tracking leaf spring members provided such that the respective one end sides are fixed to a fixing member, and structured to be elastically deformable to the tracking direction on a basis of the fixing section as a base end, a pair of second tracking leaf spring members provided such that the respective one end sides are coupled to the optical head, having substantially the same spring effective length and spring constant as the first tracking leaf spring member, and structured to be elastically deformable to the tracking direction, and coupling members for coupling the respective other end sides of the first tracking leaf spring members and the second tracking leaf spring members.

11 Claims, 12 Drawing Sheets

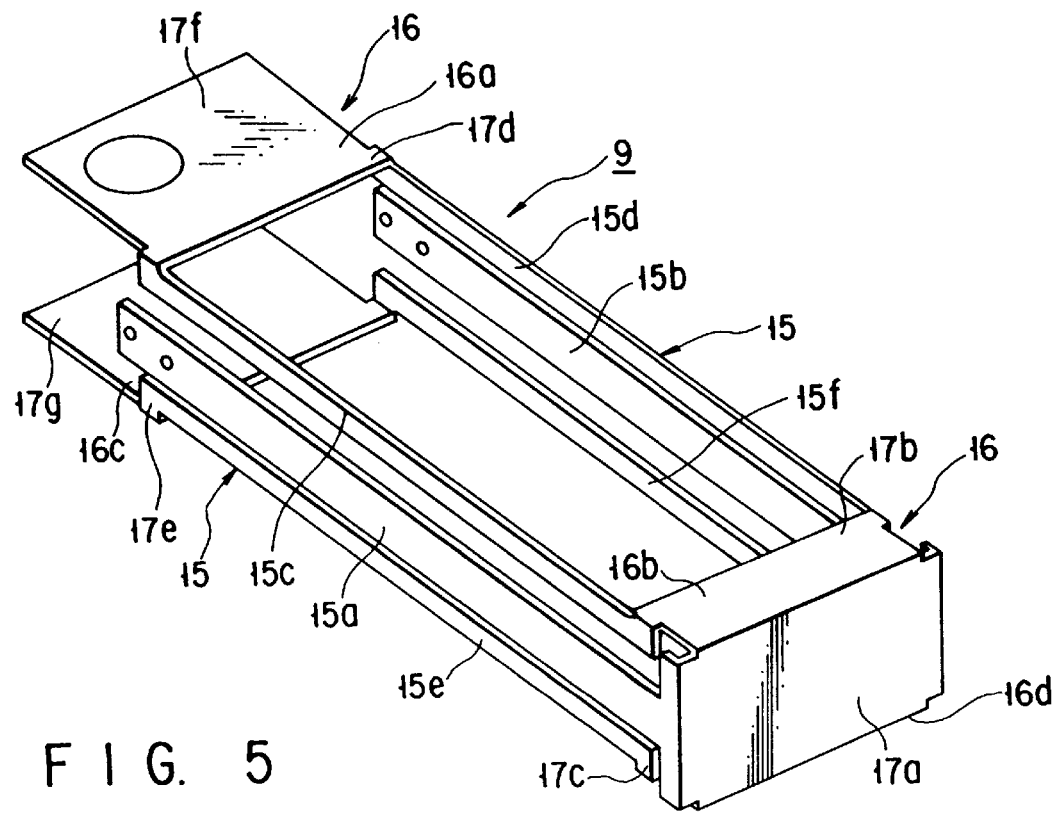
F I G. 5
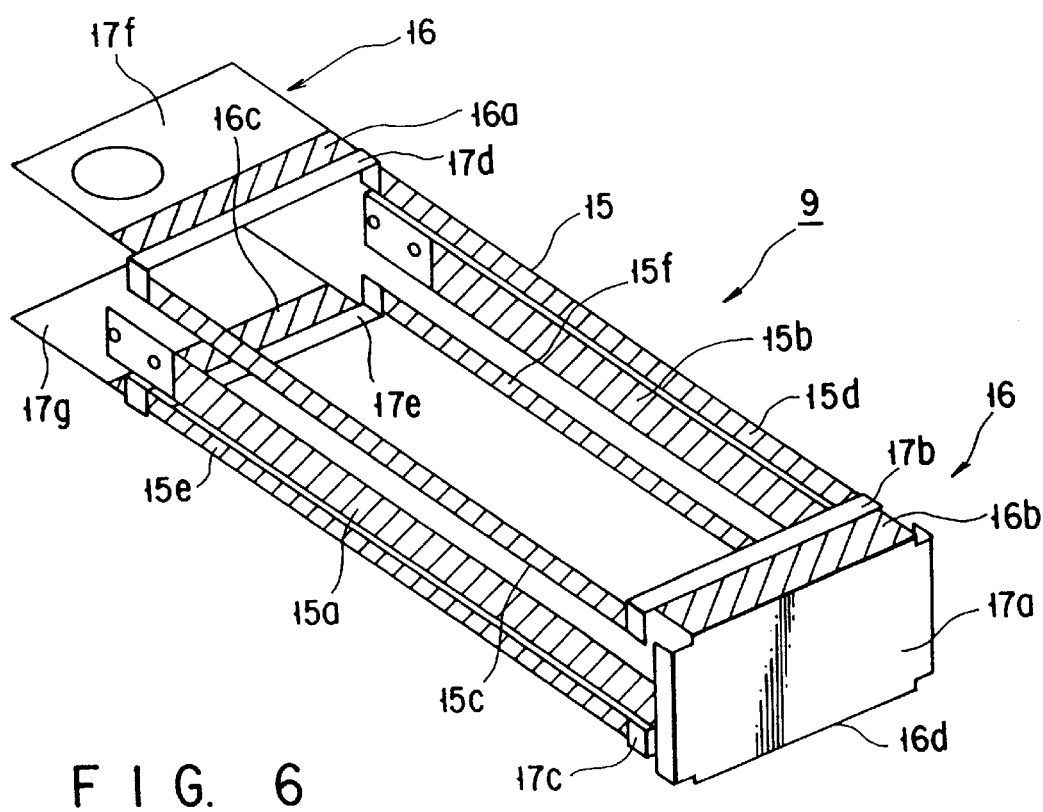
F I G. 6

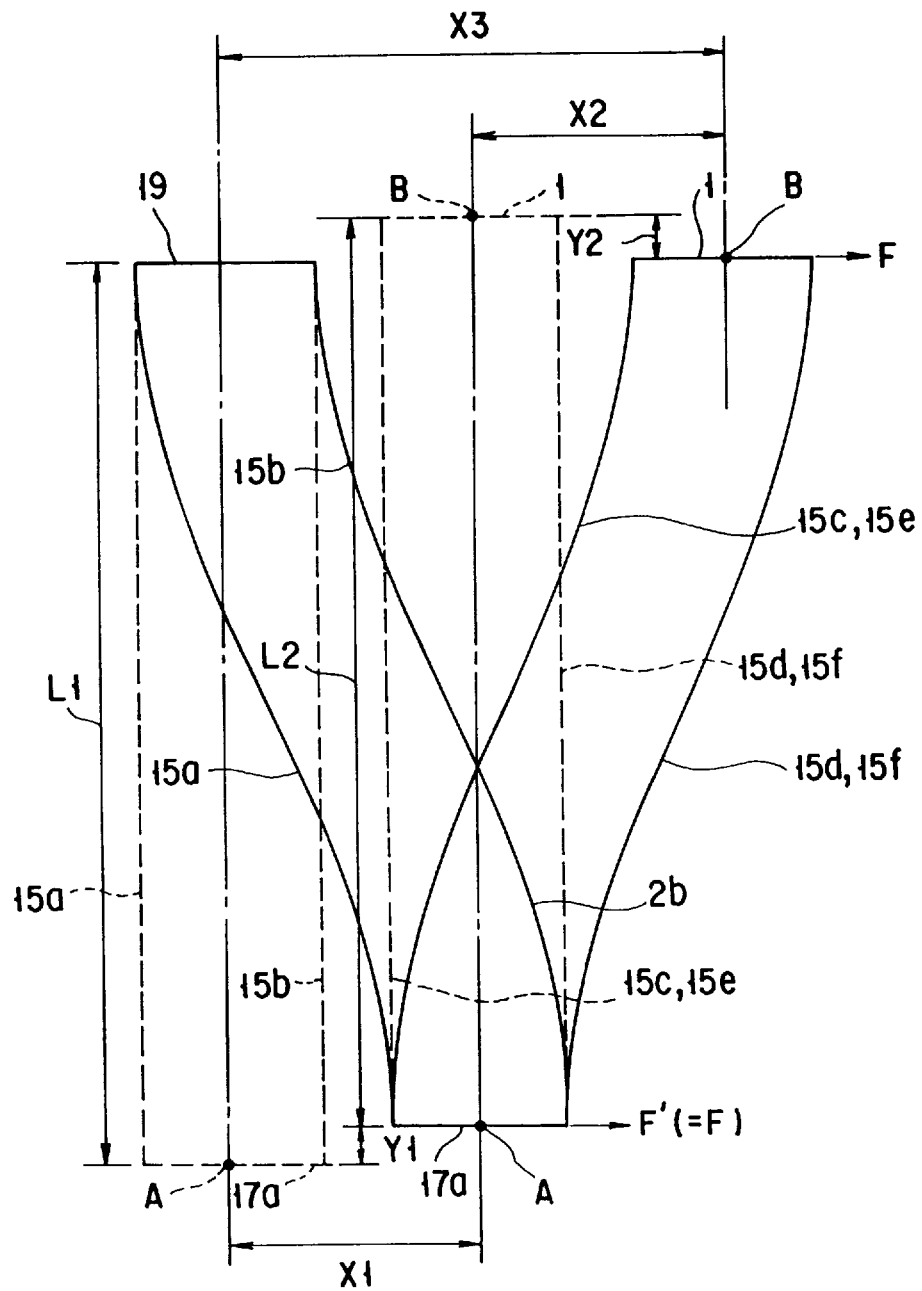
F I G. 8

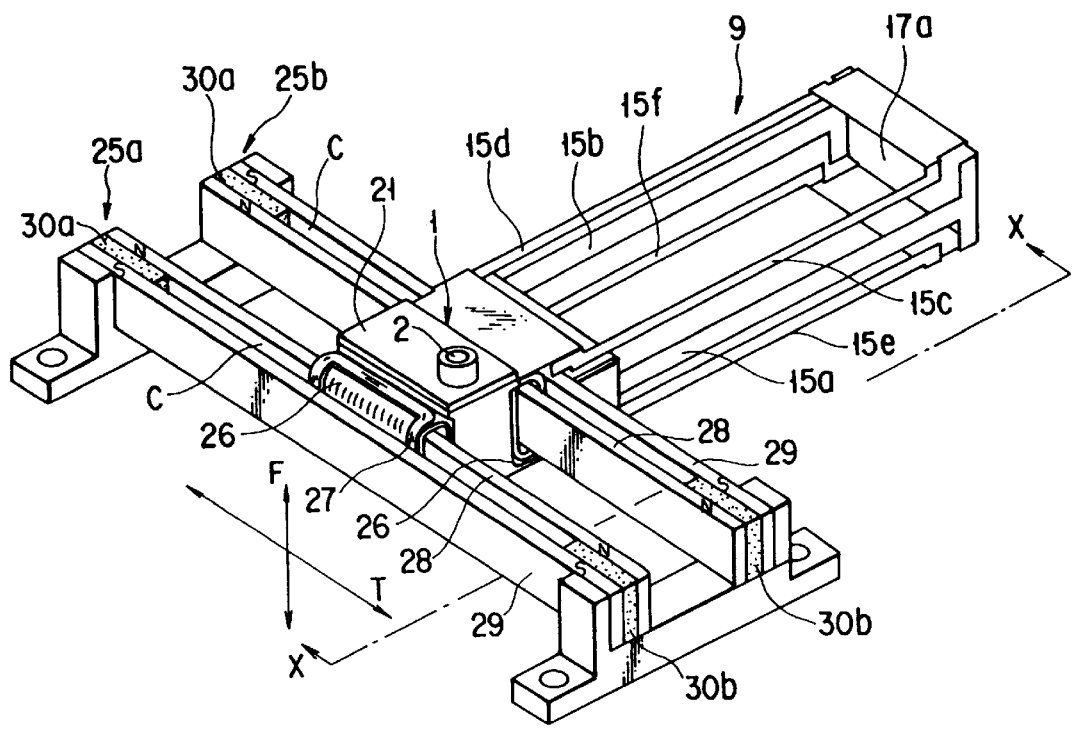
F I G. 9
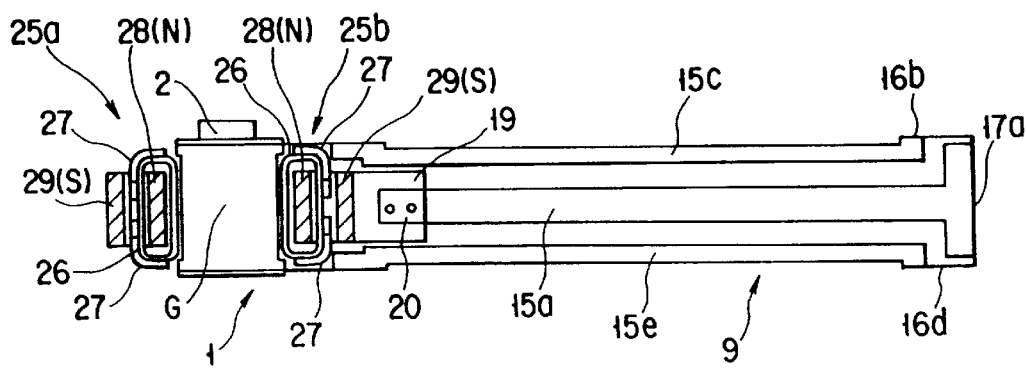
F I G. 10

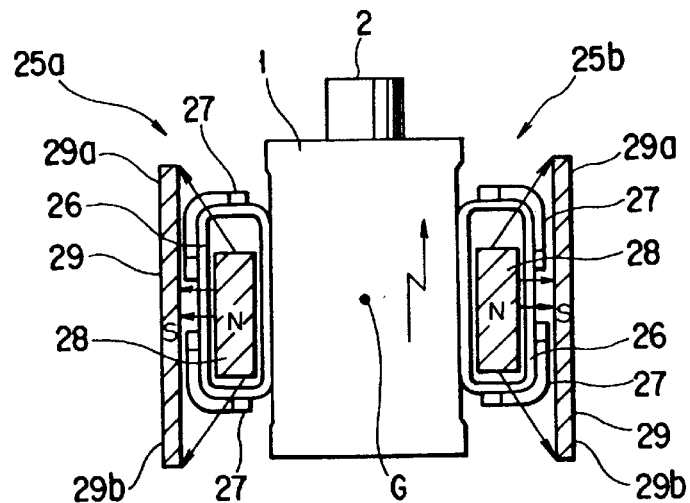
F I G. 15A
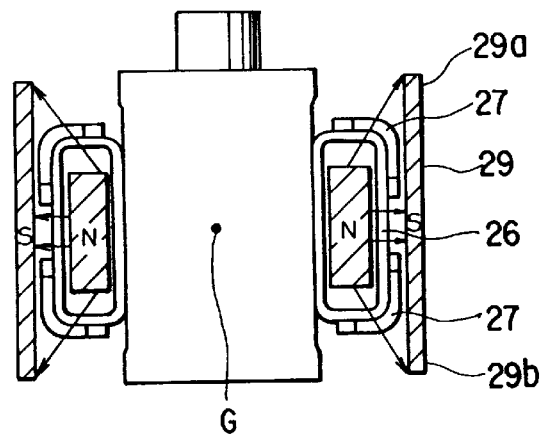
F I G. 15B
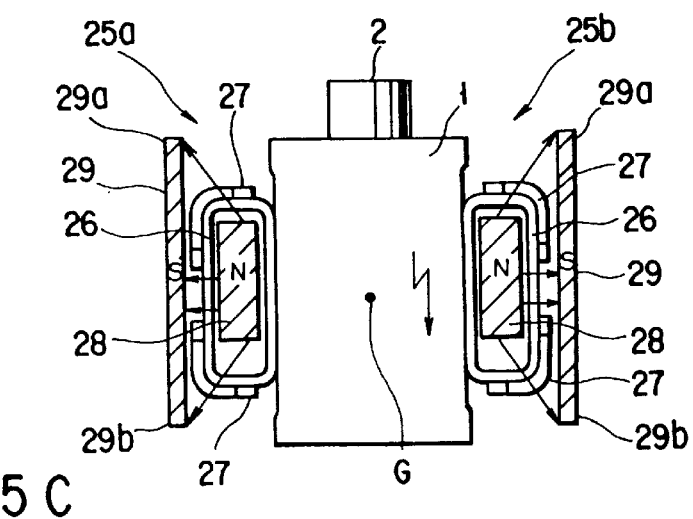
F I G. 15C

OPTICAL HEAD DRIVER

BACKGROUND OF THE INVENTION

1. Field of the Invention

The present invention relates to an optical head driver used in an optical data recording/reproducing apparatus for recording/reproducing an information signal to/from an optical recording medium such as an optical disk, and particularly to an optical head driver, which can hold a movable section of an optical head by a composite parallel spring mechanism to be largely displaced in a tracking direction, and which can prevent the movable section from being shifted to a direction perpendicular to the tracking direction.

2. Description of the Related Art

Conventionally, there is known an optical disk device, that is, a device for providing irradiation of a light beam to a signal recording surface of an optical disk to be rotated so as to read an information signal recorded in the optical disk or write the information signal to the optical disk.

In the above device, there is provided an optical head as means for writing (recording) and reading (reproducing) the information signal. The optical head comprises a light source such as a semiconductor laser element, an optical element such as a collimator lens, a beam splitter, an objective lens, and a photo detector so that the light beam emitted from the light source is guided to the objective lens through the optical element. Then, the light beam is converged onto the recording surface of the optical disk by the objective lens, and the light beam reflected by the recording surface is detected by the photo detector, thereby the information signal is recorded/reproduced.

The objective lens is driven to be precisely displaced in two axial directions, that is, a direction of an optical axis (focusing direction) and a direction perpendicular to the direction of the optical axis (tracking direction) by an electromagnetic driving force of an objective lens driving device. Thereby, the light beam is converged onto the recording surface of the optical disk so as to correctly scan a recording track of the optical disk.

In the movable range of the objective lens, high accurate positioning is required even if the optical head (optical system combination type) with which the optical system is combined is used or the optical head (optical system separation type) to which only the optical system is separately fixed is used. Due to this, the movable range of the objective lens is generally small, that is, about ±0.6 mm in the focusing direction and about ±0.4 mm in the tracking direction.

Therefore, in the optical head having the above-mentioned object lens driving device, there is needed a coarse positioning mechanism, which comprises a coarse motor and a guide rail, etc., such as a linear motor for driving the optical head in order that the objective lens can be sought on any track of the optical disk. Due to this, in the conventional optical disk, there were problems in that the entire apparatus was large and complicated, and the control of the apparatus was complicated.

Moreover, according to the above-mentioned structure, a seek control system is structured by a two-stage servo system including the high accurate positioning means (objective lens driving device) for directly driving the objective lens and the coarse positioning mechanism (coarse motor) for driving the optical head. Due to this, there is difficulty in performing a high-speed seek operation.

In order to solve the above-mentioned problem, Japanese Patent Application KOKAI Publication No. 5-166212 (hereinafter called as prior art) discloses the following optical disk device.

More specifically, as shown in FIG. 1 or 8 of the prior art, only the movable section for holding the objective lens is driven over a wide range in the tracking direction, so that the objective lens is structured to be movable on any track of the optical disk.

In the above prior art, the structure of the optical disk is the so-called optical system separation type, so that the movable section for holding only the objective lens is driven to be displaced. As shown in FIGS. 1 and 8 of the prior art, the movable section for holding only the objective lens is elastically supported in the tracking direction by the parallel spring mechanisms arranged at least one of right and left of the tracking direction. Thereby, the movable section can be largely displaced.

However, in the above-explained prior art, there are problems to be solved as follows.

First, the structure for holding the optical head is complicated, and the movable section is shifted in a direction perpendicular to the tracking direction during the driving. Due to this, there is difficulty recording and reproducing information.

In other words, in the structure shown in FIG. 1 of the prior art, since the parallel spring mechanisms are arranged at both right and left sides, the structure becomes complicated. Also, the balance between the right and left spring mechanisms must be kept with high accuracy. If the balance is lost, the movable section for holding the objective lens is shifted to the direction perpendicular to the tracking direction, thereby making it impossible to perform the recording and the reproducing.

Moreover, if the positional shift of the objective lens occurs in the direction perpendicular to the tracking direction, an azimuth is generated on the optical detector of the optical head. The azimuth is an angle which is formed between a track contact line at the time when the optical spot is positioned on a certain track of the recording medium and a track contact line at the time when the positional shift of the objective lens occurs in the direction perpendicular to the tracking direction. If the azimuth is generated, a tracking error detection sensitivity is lowered, and a reproduction signal characteristic deteriorates.

Even if the above-mentioned optical beam correcting means is provided, the generation of the azimuth cannot be prevented. Particularly, in the largely displacement area, it was difficult to correctly perform the recording and the reproducing.

Second, if the movable section is driven in the tracking direction in a state that the movable section for holding the objective lens is displaced up and down, a torque occurs in the movable section at a perpendicular surface, and there is a possibility that the movable section may become inclined.

In other words, in the above-mentioned prior art, if the movable section is driven in the tracking direction in a state that the movable section for holding the objective lens is driven in the focusing direction, a function point of the driving force of the tracking direction is shifted up and down. As a result, the torque occurs in the movable section, thereby, there occurs a case in which force is applied onto the movable section in a direction where the movable section is inclined.

As mentioned above, if the inclination occurs in the movable section, the optical axis of the objective lens is shifted, and the position of the optical spot is shifted in the tracking direction. Due to this, it is difficult to correctly perform the recording and the reproducing.

SUMMARY OF THE INVENTION

An object of the present invention is to provide an optical head drive device wherein a movable section of an optical head is structured to be held by a compound parallel leaf-spring mechanism to be capable of large displacements so that the movable section is not shifted to a direction perpendicular to a tracking direction even in a large displacement area.

Another object of the present invention is to provide an optical head drive device, which can improve the performance of a drive mechanism for driving the movable section of the optical head and which can prevent the movable section from becoming inclined due to the application of a torque to the movable section, even in a case where the movable section is driven in a state that the movable section is driven in a focusing direction.

In order to achieve the above objects, an optical head driving device is provided wherein an objective lens of the optical head is driven to a recording medium and the recording medium is irradiated with a light beam to execute at least data signal recording and reproducing, comprising: a movable section for holding at least the objective lens; a drive mechanism for driving the movable section by magnetic force; and a compound parallel leaf-spring mechanism for movably holding the movable section in a driving direction of the drive mechanism, the compound parallel leaf-spring mechanism comprising: a pair of first tracking spring members provided in a tracking direction of the objective lens to have a predetermined distance, and structured such that each one end side is unmovably fixed, and the other end side is elastically deformable to the tracking direction on a basis of the one end side as a base end; and a pair of second tracking spring members, provided in the tracking direction of the objective lens to have a predetermined distance, having substantially the same effective spring length and spring constant as the first tracking spring members, and the second tracking spring members structured such that each one end side is coupled to the optical head, and the other end side is elastically deformable to the tracking direction.

In a case where the above-mentioned driving mechanism is formed of an open magnetic circuit, it is preferable that a magnetic flux supply area of the magnetic circuit in the focusing direction completely includes the tracking coil provided in the movable section in consideration of the movable range of the movable section in the focusing direction.

Also, in a case where the above-mentioned driving mechanism is formed of a closed magnetic circuit, it is preferable that the tracking coil provided in the movable section is formed to be rectangular and cylindrical, and that the magnetic flux supply area of the magnetic circuit in the focusing direction completely includes one side where tracking drive force seen from the tracking direction of the rectangular and cylindrical tracking coil in consideration of the movable range of the movable section in the focusing direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a perspective view in which only a compound parallel leaf-spring mechanism is extracted;

FIG. 6 is a schematic view in which an effective movable section of the compound parallel leaf-spring mechanism of FIG. 5 is emphasized;

FIG. 8 is a view explaining a size of the device after deforming the compound parallel leaf springs mechanism:

FIG. 9 is a perspective view of an outline of an optical head drive device of a second embodiment of the present invention;

FIG. 10 is a vertical cross sectional view taken along a line X—X of FIG. 9;

FIGS. 15A, 15B and 15C are process views of the driving operation of the optical head to a focusing direction in connection with an optical head drive device of a fifth embodiment of the present invention, and each of FIGS. 15A to 15C corresponds to the vertical cross section taken along a line XV—XV of the second embodiment of FIG. 12.

DETAILED DESCRIPTION OF THE PREFERRED EMBODIMENTS

First to fifth embodiments of the present invention will be explained with reference to the corresponding figures.

A first embodiment will be explained with reference to FIGS. 1 to 8.

Figure 1:
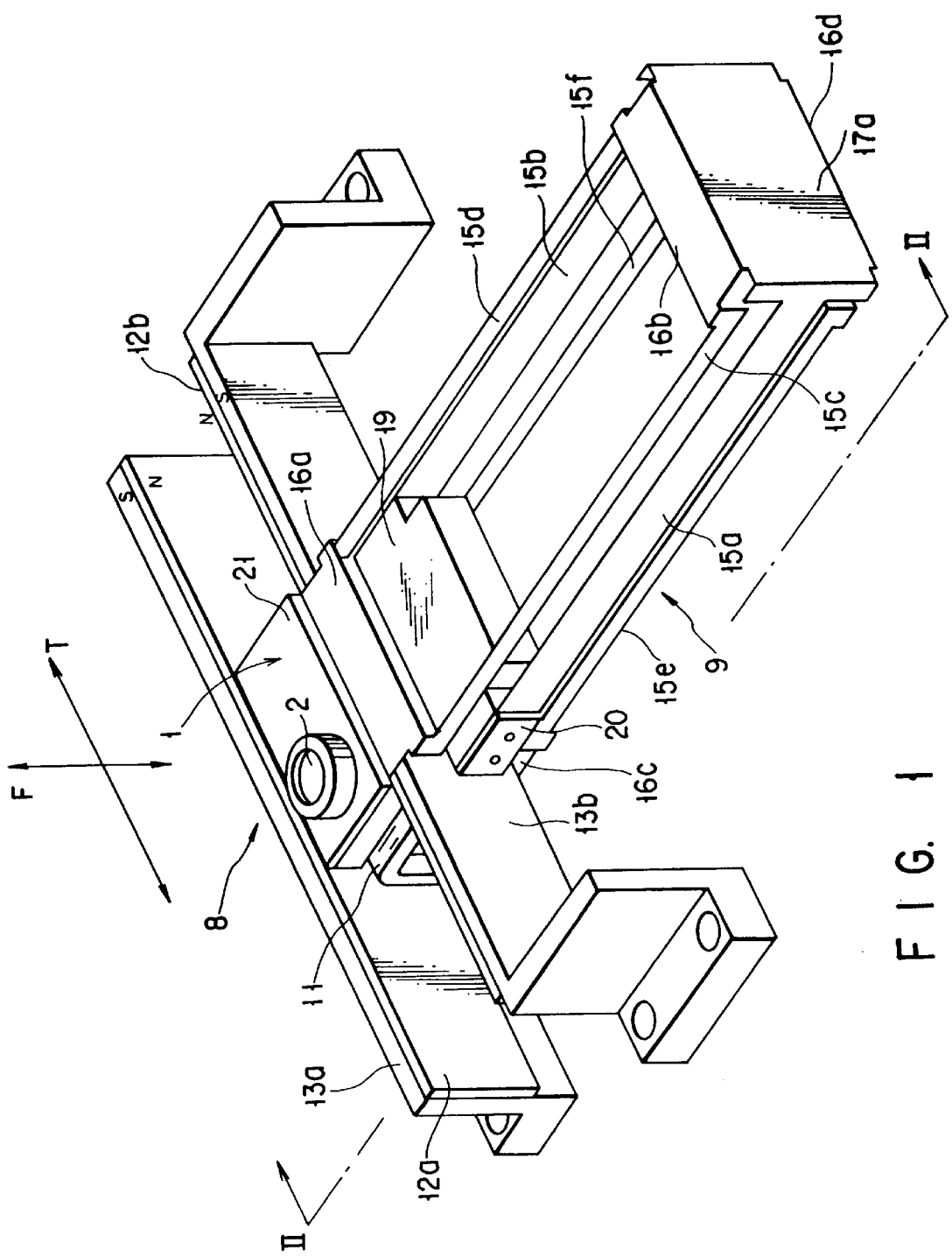
FIG. 1 is a perspective view of an outline of an optical head drive device of a first embodiment of the present invention.
Figure 2:
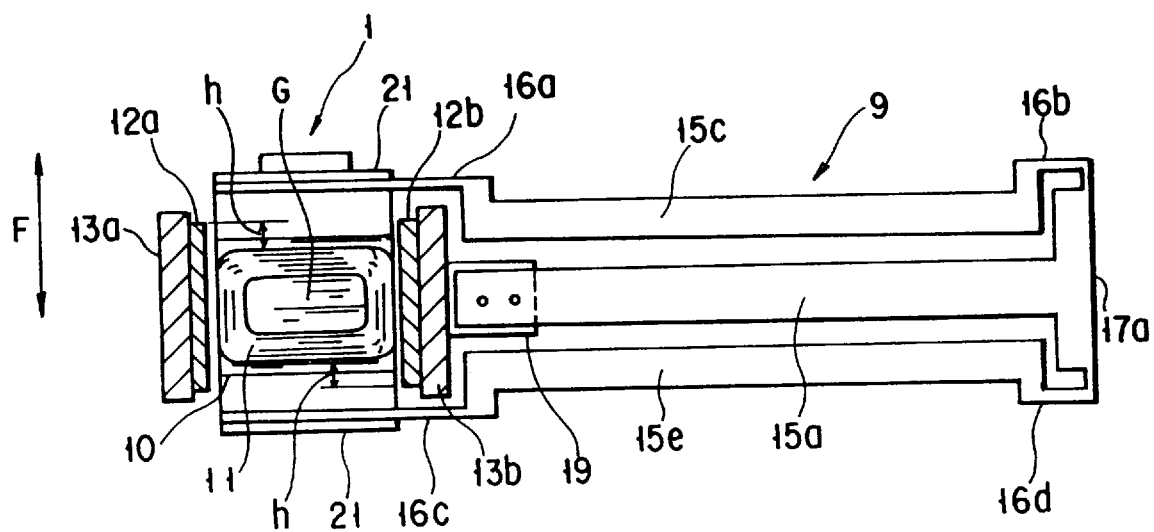
FIG. 2 is a vertical cross sectional view taken along a line II—II of FIG. 1.

FIG. 1 is a perspective view showing the structure of an optical head drive device of the first embodiment of the present invention, and FIG. 2 is a vertical cross sectional view taken along a line II—II of FIG. 1.

The optical head drive device of FIG. 1 is a device for driving an optical head 1 (movable section) to be positioned in two axial directions, that is, a tracking direction (T) and a focusing direction (F).

Figure 3:
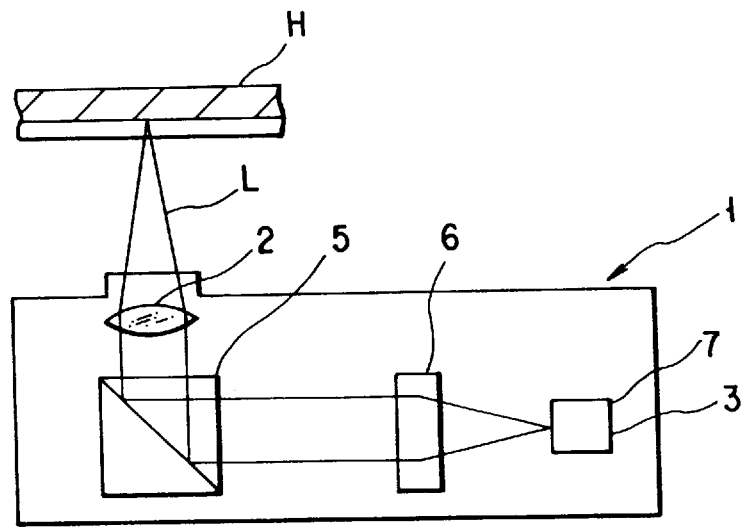
FIG. 3 is a schematic structural view showing a movable section of an optical head.

The optical head 1 is an integrated one-piece optical head for optical disk drives. That is, as shown in FIG. 3, an objective lens 2, a semiconductor laser element 3, a beam splitter 5, a hologram optical element 6, and a photo detector 7 are built in the optical head 1. The optical head 1 is structured such that a data recording medium (optical disk) H (shown in FIG. 3 in a simple form) is irradiated with a light beam L to selectively record and reproduce an information signal.

As shown in FIG. 1, the optical head drive device comprises a driving mechanism 8 for driving the optical head 1 in the tracking direction T and the focusing direction F by electromagnetic driving force and a compound parallel leaf-spring mechanism 9 for supporting the optical head 1 to be movable in the tracking direction (T) and the focusing direction (F).

First, the driving mechanism 8 will be specifically explained as follows.

Figure 4:
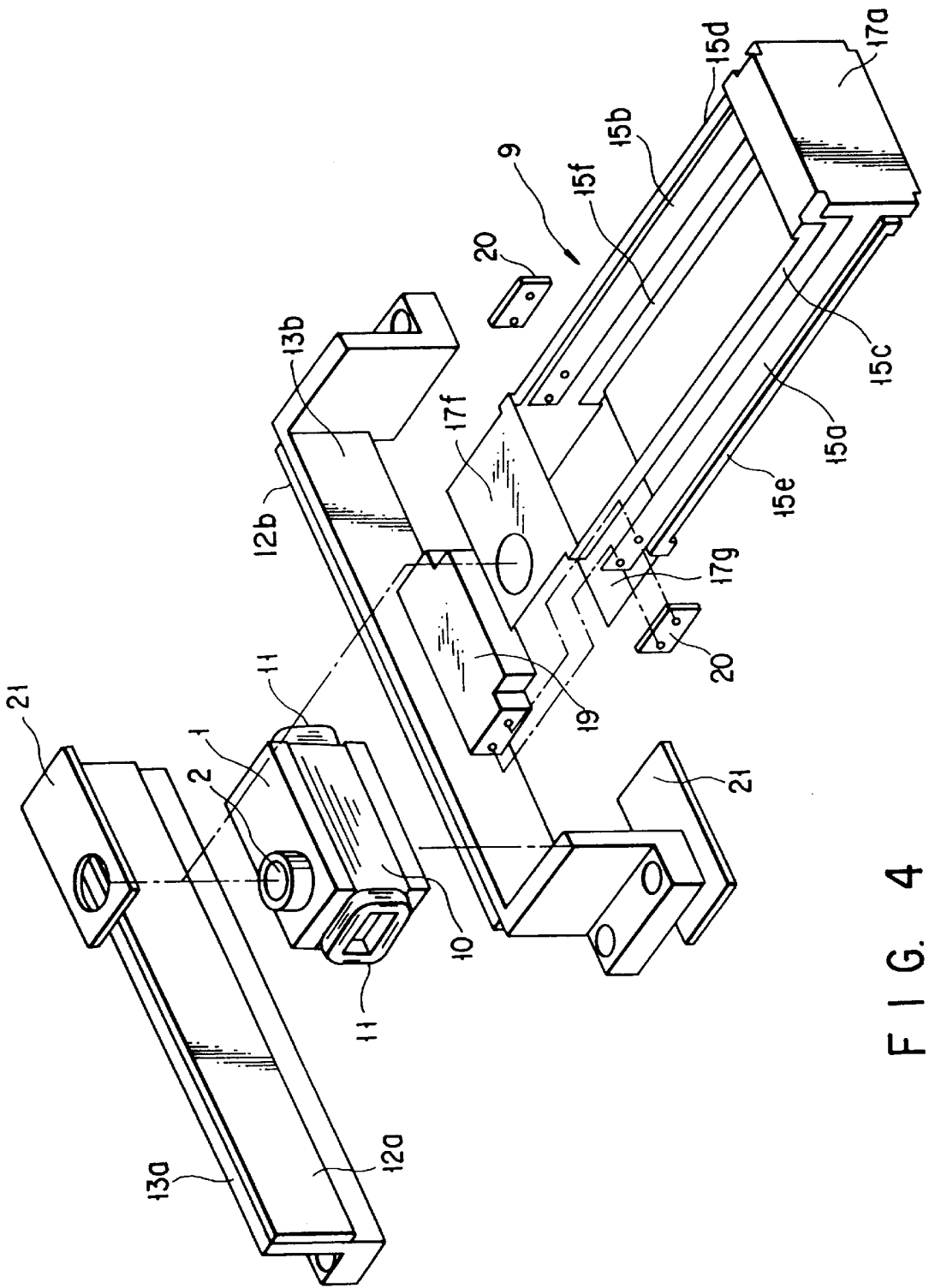
FIG. 4 is an exploded perspective view of the optical head of FIG. 1.

The movable side of the driving mechanism 8 comprises a focusing coil 10, which is wound around the side surface of the optical head 1 as shown by the exploded view of FIG. 4, and a tracking coil 11. The fixed side of the driving mechanism 9 comprises a pair of strip-shaped magnets 12a and 12b (magnetism generating members), which are opposite to each other to sandwich the optical head 1 therebetween, and magnet holding members 13a and 13b for holding the magnets 12a and 12b. The magnet holding members 13a and 13b have a function of holding the magnets 12a and 12b parallel to the tracking direction T in a state that a predetermined space is formed between the magnet holding members 13a and 13b and the coils 10 and 11 formed in the optical head 1.

Then, the driving mechanism 8 supplies a control current to the focusing coil 10 and the tracking coil 11, thereby causing a current to flow which crosses magnetic flux from the magnets 12a and 12b, into the focusing coil 10 and the tracking coil 11. Due to this, magnetic force (Lorentz force) is generated. Then, the optical head 1 is driven in two directions, that is, the tracking direction T and the focusing direction F by the generated magnetic force.

Next, the compound parallel leaf-spring mechanism 9 will be specifically explained.

As shown in FIGS. 1 and 2, the compound parallel leaf-spring mechanism 9 is provided either right or left to direct in the tracking direction (right side in this embodiment). The compound parallel leaf-spring mechanism 9 holds the optical head 1 between the magnets 12a and 12b to be in non-contact with these magnets. The compound parallel leaf-spring mechanism 9 also has a function of holding the optical head 1 to be freely movable in the tracking direction T and the focusing direction F.

FIGS. 5 and 6 are perspective views in which only the compound parallel leaf-spring mechanism 9 is extracted. In FIG. 6, slash marks are added to the main effective movable section in order to easily understand the structure and the operation of the compound parallel leaf-spring mechanism 9.

The compound parallel leaf-spring mechanism 9 comprises a tracking parallel leaf-spring section 15, which forms the side surface of this mechanism and is provided to be freely elastic deformable in the tracking direction, and a focusing parallel leaf-spring section 16, which forms the upper and lower surfaces of this mechanism 9 and is provided to be freely elastic deformable in the focusing direction (up and down directions).

The tracking parallel leaf-spring section 15 has a pair of first tracking leaf spring members 15a and 15b (first tracking spring members), and pairs of second tracking leaf spring members 15c and 15d, and 15e and 15f (second tracking spring members, second tracking elastic members).

The first tracking leaf spring members 15a and 15b are structured to be flexible with the same elasticity in the tracking direction spring members. The second tracking leaf spring members 15c and 15d, and 15e and 15f are provided at up and down portions of the first tracking leaf spring members 15a and 15b, and also structured to be flexible with the same elasticity in the tracking direction spring members.

Regarding the leaf spring member, it is noted that the description "a pair" in the claims means that right and left members, which are arranged in parallel to each other, form a pair. Particularly, the second tracking leaf-spring members are paired by members 15c and 15e, which are portioned at the right side, and members 15d and 15f, which are positioned at the left side. Then, the leaf-spring members 15d and 15c, which are positioned at the upper side to sandwich the first tracking leaf-spring members 15a and 15b, correspond to "one spring members" in the claims, and the leaf spring members 15e and 15f, which are positioned at the lower side correspond to "other spring members" in the claims.

The focusing parallel leaf-spring section 16, as shown in FIG. 6, has a pair of first focusing leaf spring members 16a and 16b (first focusing spring members), and a pair of second focusing leaf-spring members 16c and 16d (second focusing spring members: 16d is not shown in FIG. 6).

The first focusing leaf-spring members 16a and 16b are respectively provided at one side (optical head side) of the tracking leaf-spring section 15 and the other side to be structured to be flexible with the same elasticity in the focusing direction spring members.

As shown in FIG. 6, coupling leaf-spring members 17a to 17e are provided between the respective leaf spring members. The first coupling leaf-spring member 17a (coupling member, first coupling member) forms the other end surface of the compound parallel leaf-spring mechanism 9 such that the other ends of the first tracking leaf-spring members 15a and 15b are coupled to each other, and the other ends of the first and second focusing leaf-spring members 16b and 16d are coupled to each other.

The second and third coupling leaf-spring members 17b and 17c couple one end of the respective first and second focusing leaf-spring members 16b and 16d to the other end of the respective second tracking leaf-spring members 15c to 15f. Moreover, the fourth and fifth coupling leaf-spring members 17d and 17e couple one end of the respective second tracking leaf-spring members 15c to 15f to the other end of the respective first and second leaf-spring members 16a and 16c.

Then, a pair of sixth coupling leaf-spring members 17f and 17g are formed at one end of the respective first and second focusing leaf-spring members 16a and 16c so as to couple the first and second focusing leaf-spring members 16a and 16c to the optical head 1 (shown in FIG. 4).

The above-explained compound parallel leaf-spring mechanism 9 is formed by etching and pressing, or dieing and bending one spring steel material to be integral-therewith.

The first tracking leaf-spring members 15a and 15b, and the second tracking leaf-spring members 15c, 15d, and 15e and 15f are structured such that an effective length of the spring (length of a longitudinal direction of a slash portion of FIG. 4) and a spring constant are substantially equal to each other.

In other words, the first tracking leaf spring members are formed such that one member 15a and the other member 15b have substantially the same effective length of the spring and the spring constant. Also, one member 15a and the second tracking leaf-spring members 15c and 15e, which sandwich the member 15a have substantially the same effective length of the spring and the spring constant (in a case that members 15c and 15e are combined). Then, the other member 15b and the second tracking leaf spring members 15d and 15f, which sandwich the member 15b have substantially the same effective length of the spring and the spring constant (in a case that members 15d and 15f are combined). Thereby, even if the optical head 1 is driven in the tracking direction, the position of the optical head 1 can be prevented from being shifted to the direction perpendicular to the tracking direction (to be specifically described later).

Moreover, regarding the first focusing leaf-spring members 16a and 16b and the second focusing leaf-spring members 16c and 16d, the members 16a and 16c, which are opposite to each other, up and down, have substantially the same effective length of the spring and the spring constant. Similarly, the members 16b and 16d have substantially the same effective length of the spring and the spring constant. In this case, the members 16a and 16b do not necessarily have the same effective length of the spring and the spring constant. The same can be applied to the case of the members 16c and 16d.

As a spring material, which forms the compound parallel leaf springs mechanism 9; stainless, beryllium copper, and phosphor bronze are used. If a leaf spring to which damper material is adhered or a sandwich-structured leaf spring the damper material is sandwiched is used as the compound parallel leaf-spring mechanism 9, there can be brought about effects in restraining an amount of gain rise of in a first resonance frequency of the optical head drive device and a sub-resonance frequency, so that the optical head drive device having a good frequency response (Bode's diagram) can be obtained.

The following will explain how the compound parallel leaf-spring mechanism 9 is attached with reference to FIG. 4.

Concerning the attachment of the compound parallel leaf-spring mechanism 9, as shown in FIG. 4, one of the respective first tracking leaf-spring members 15a and 15b is fixed to a fixing member 19 secured to a rear surface of one support member 13b. Then, the fourth coupling leaf-spring members 17f and 17g are fixed to the optical head 1 to sandwich the optical head 1 from upper and lower directions.

As a fixing member 20 for fixing the first tracking leaf-spring members 15a and 15b to the fixing member 19, any material such as screws or adhesion may be used if the material can firmly position and fix the compound parallel leaf-spring mechanism 9 to the fixing member 19.

Also, as a fixing member 21 for fixing the fourth coupling leaf spring members 17f and 17g to the optical head 1, any material such as screws or adhesion may be used if the material can firmly position and fix the compound parallel leaf springs mechanism 9 to the fixing member 19 as shown in FIG. 4. In this case, an opening for exposing the objective lens 2 is needed in the upper side coupling leaf-spring member 17f, which is fixed to the upper surface of the optical head 1, and the fixing member 21.

In a state that the compound parallel leaf springs 9 is attached, as shown in FIG. 1, the first tracking leaf-spring members 15a and 15b and the second tracking leaf-spring members 15c to 15f are held to be parallel to each other along a direction substantially perpendicular to the tracking direction T and the focusing direction F. The first tracking leaf-spring members 15a and 15b are slidably held in a state that the fixing member 19, which is fixed to the rear surface of the support member 13b, is used as a base end. Then, the second tracking leaf spring members 15c to 15f are slidably held in a state that the second coupling leaf spring member 17a is used as a base end. Thereby, the optical head 1, which is held at one end of the respective second leaf-spring members 15c to 15f, is held to be movable to the tracking direction (FIG. 7).

Figure 7:
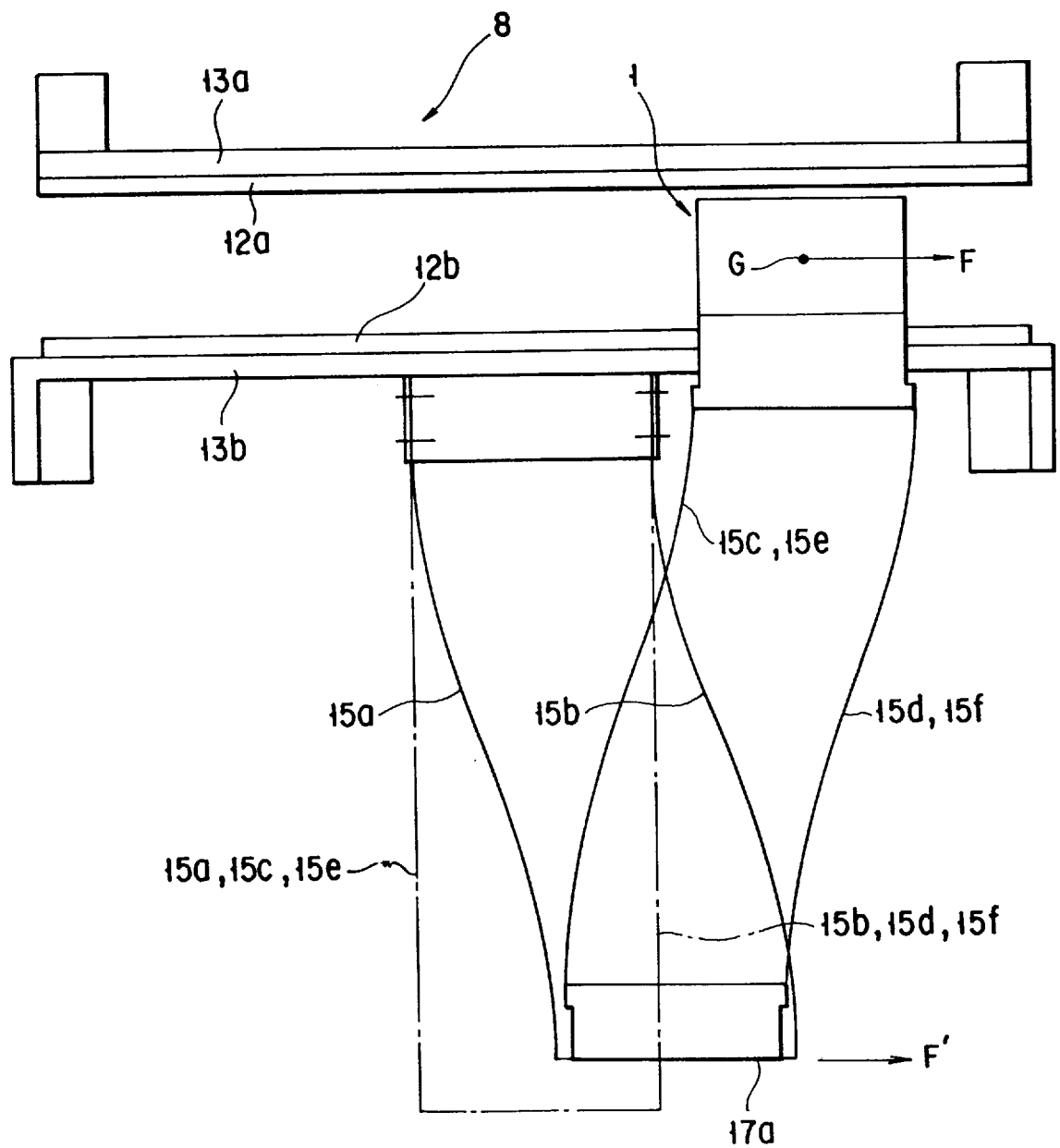
FIG. 7 is a schematic view showing an operation of the optical head drive device.

The following will explain an operation of the compound parallel leaf springs mechanism 9 with reference to FIGS. 7 and 8. FIG. 8 is a plane view in which only the compound parallel leaf-spring mechanism 9 is extracted to simplify the explanation.

It is assumed that a tracking control current is supplied to the tracking coil 11, which is provided at the optical head 1, Lorentz force, serving as tracking drive force F, acts on the optical head 1. Thereby, as shown in FIG. 7, the optical head 1 is moved in the tracking direction.

More specifically, tracking force F acts on one end portion of the respective second tracking leaf-spring members 15c, 15e, to which the optical head 1 is coupled, and 15d and 15f from the optical head 1. Also, tracking force F' (shown in FIG. 7) acts on the other end portion of the respective first tracking leaf-spring members 15a and 15b through the first coupling leaf-spring member 17a from the second tracking leaf-spring members 15c to 15f.

As a result, the first tracking leaf-spring members 15a, 15b and the second tracking leaf-spring members 15c to 15f are finally displaced as shown in FIG. 7. In the figure, dotted lines show the state before the compound parallel leaf-spring mechanism 9 is deformed.

The following will specifically explain the deformation of the compound parallel leaf-spring mechanism 9 with reference to the schematic view of FIG. 8.

First, in regard to the first tracking leaf spring members 15a and 15b, a position A of the other end portion (first coupling leaf-spring member 17a) of the respective leaf-spring members 15a and 15b is shifted to one end portion (side fixed to the fixing member 19) by X1 in the tracking direction and by Y1 in the direction perpendicular to the tracking direction from the state before the compound parallel leaf-spring mechanism 9 is deformed (shown by the dotted line).

Also, in regard to the second tracking leaf-spring members 15c to 15f, a position B of one end portion (side where the optical head 1 is held) of the respective leaf spring members 15c to 15f is shifted to the other end portion (side fixed to the first coupling leaf-spring member 17a) by X2 in the tracking direction and by Y2 in the direction perpendicular to the tracking direction from the state before the compound parallel leaf-spring mechanism 9 is deformed (shown by the dotted line).

However, in this embodiment, since the spring effective length and the spring constant of each of the first tracking leaf-spring members 15a and 5b and those of each of the second tracking leaf-spring members 15c to 15f are set to be equal to each other, X1=X2 and Y1=Y2 are established.

In this case, the important point is that not only the amounts of shifts Y1 and Y2 are the same as each other but also shifts Y1 and Y2 are generated in a direction which is opposite to each other. Due to this, even if tracking drive function F acts on the optical head 1 and the first and second tracking leaf-spring members 15a to 15f are elastically deformed in the tracking direction, the shifts Y1 and Y2 cancel each other, and the optical head 1 is not shifted in the direction perpendicular to the tracking direction.

Therefore, the optical head 1 is driven by the amount shown by X3 (X1+X2) of the figure in the tracking direction without being shifted to the direction perpendicular to the tracking direction.

Also, G shown in FIG. 7 is a preferable drive resultant force acting position of the optical head 1 (if drive resultant force acts on the position, no inclination is generated in the optical head 1). Drive force F due to the drive mechanism 8 acts on the position G.

The following will explain the drive of the optical head to the focusing direction (upper and lower directions) with reference to FIG. 2.

In this case, a focusing control current is supplied to the focusing coil 10, so that Lorentz force in the upper and lower directions acts on the focusing coil 10 provided between the pair of the magnets 12a and 12b, and the optical head 1 is driven up and down.

At this time, since the first and second focusing leaf-spring members 16a to 16d have the same spring effective length and the spring constant, a function as a parallel leaf spring (the optical head can be supported to be movable in parallel) can be exerted.

Moreover, in this embodiment, the magnets 12a and 12b (magnetism generating member) are formed such that the tracking coil 11 is positioned in a magnetic flux supply area due to the magnets 12a and 12b even if the optical head 1 is driven up and down. In other words, a distance h, which is from the upper end of the tracking coil 11 to the upper end of the respective magnets 12a, 12b, and a distance h, which is from the lower end of the coil 10 to the lower end of the respective magnets 12a, 12b, are set to be larger than ±0.6 mm of the drive range of the optical head 1 in the optical head 1.

Thereby, even if the optical head 1 is driven in the focusing direction, the tracking coil 11 can be positioned in the magnetic flux generating area due to the magnets 12a and 12b.

In this case, the important point is that the acting position G of driving force in the tracking direction is positioned at the center of gravity seen from the direction perpendicular to the focusing direction of the optical head 1 and the tracking direction (disk tangential direction). Thereby, the torque of the perpendicular surface can be prevented from being generated in the optical head 1 during the drive to the tracking direction.

According to the above-mentioned structured, the following advantages can be obtained.

More specifically, first, the objective lens 2 can be largely displaced in the tracking direction by one drive mechanism 8. In this case, the objective lens 2 can be effectively prevented from being shifted to the direction perpendicular to the tracking direction.

In other words, in the conventional optical disk device, there was no consideration in which the spring effective length of the parallel leaf-spring mechanism or the spring constant are made substantially equal to each other. As a result, in holding the objective lens by providing the parallel leaf-spring mechanism in either right or left of the tracking direction, there was the possibility that the objective lens would be shifted to the direction perpendicular to the tracking direction.

In order to solve the above problem, a light beam correcting means is provided in the conventional case. However, there was a possibility that the structure and the control would be complicated and that the entire device would be enlarged.

In contrast, according to the present invention, the effective length and the spring constant of the first tracking leaf spring members 15a and 15b, which are provided parallel to the direction perpendicular to the tracking direction, are formed to be substantially equal to those of the second tracking leaf-spring members 15c to 15f. Thereby, even if the optical head 1 is displaced to the tracking direction on any of tracks of the recording medium H, the optical head 1 can be effectively prevented from being shifted to the direction perpendicular to the tracking direction. Therefore, unlike the prior art, no light beam correction means is needed, and the structure and the control of the device can be simplified.

In the above conventional device, even if the light beam correcting means is provided, the objective lens cannot be prevented from being shifted. Due to this, the generation of the so-called azimuth cannot be controlled. However, in the present invention, since the position of the optical head 1 (objective lens 2) itself can be effectively prevented from being shifted, no azimuth is generated, and the problem as in the prior art does not occur.

Therefore, according to the above-mentioned structure, the optical head 1 can be effectively prevented from being largely shifted to the direction perpendicular to the tracking direction to a level in which recording and reproducing cannot be performed.

Second, according to the above-mentioned structure, the structure of the compound parallel leaf-spring mechanism 9 can be simplified, and accuracy of positioning the optical head 1 can be improved.

More specifically, in the present invention, the leaf spring sections including the tracking leaf-spring section 15 and the focusing leaf-spring section 16, which can bring about the above-mentioned first advantage, can be formed as one unit. Thereby, the number of parts can be reduced so that the structure of the device can be simplified. Also, an error of the operation accuracy, which is generated in connecting several members, can be eliminated.

Moreover, according to the above-motioned structure, there can be obtained an advantage in which an extremely good frequency characteristic of the focusing direction and the tracking direction.

Third, according to the above-mentioned structure, the optical head 1 can be effectively prevented from being inclined in the horizontal surface during the drive of the optical head 1.

More specifically, in the above-mentioned embodiment, the optical head 1 is sandwiched between the pair of the magnets 12a and 12b, and a point of action of drive force F at the time of tracking is set to the position G where the optical head 1 is not rotated in the horizontal surface during the drive in the tracking direction (FIG. 7). Also, the optical head 1 can be prevented from being shifted to the direction perpendicular to the tracking direction by the compound parallel leaf-spring mechanism 9. Due to this, the point of action G is not shifted. Therefore, the optical head 1 can be effectively prevented from being inclined in the horizontal surface during the drive of the optical head 1.

Fourth, according to the above-mentioned structure, the optical head 1 can be effectively prevented from being inclined in the perpendicular surface during the drive of the optical head 1.

More specifically, in the above-mentioned conventional device, the moving section for holding the objective lens is driven up and down (focusing direction), the upper and lower end portions of the tracking coil deviate from the magnetic flux supply area. Due to this, the point of action of the drive force to the tracking direction is shifted upper and lower from the favorable point of action G. Then, if the optical head is driven in the tracking direction in a state that the point of action of the drive force is shifted upper and lower, the moment around the favorable point of action G occurs in the perpendicular surface. Due to this, a force which acts on the optical head 1 to be inclined in the perpendicular surface, is generated.

However, according to the present invention, as shown in FIG. 2, the tracking coil 11 provided in the optical head 1 is positioned to be sandwiched between the magnets 12*a* and 12*b* over the entire movable range in the focusing direction, so that the entire tracking coil 11 is positioned in the magnetic flux supply area. Due to this, the point of action of drive force against the coil 11 is not shifted. In this above embodiment, the preferable point of action G of the drive force is positioned at the center of gravity seen from the disk tangential direction of the optical head 1 (since the point of action G is positioned in the balanced surface of the focusing direction). Due to this, even if the optical head 1 is driven in the tracking direction, the generation of force, which acts on the optical head 1 to be inclined in the perpendicular surface, can be prevented.

Fifth, according to the above-mentioned embodiment, since the drive mechanism 8 constitutes an open magnetic circuit, there can be obtained a device having a simple structure and a good assembly.

Sixth, according to the above-mentioned embodiment, the optical head 1 is the optical system combination type in which all structures are built in the movable section. Due to this, unlike the optical system separation type, it is unnecessary to consider the tracking offset, so that data recording and reproducing can be surely performed. Moreover, the manufacturing cost and the assembly can be improved.

The following will explain a second embodiment of the present invention with reference to FIGS. 9 to 12.

In the above-mentioned first embodiment, the pair of magnets 12*a* and 12*b* provided in the drive mechanism 8 constitutes the so-called open magnetic circuit in which the same polarities (N in this embodiment) of the magnets 12*a* and 12*b* are opposite to each other. In the figures, the same reference numerals are added to the structural elements common to the first embodiment, and the explanation is omitted.

Figure 11:
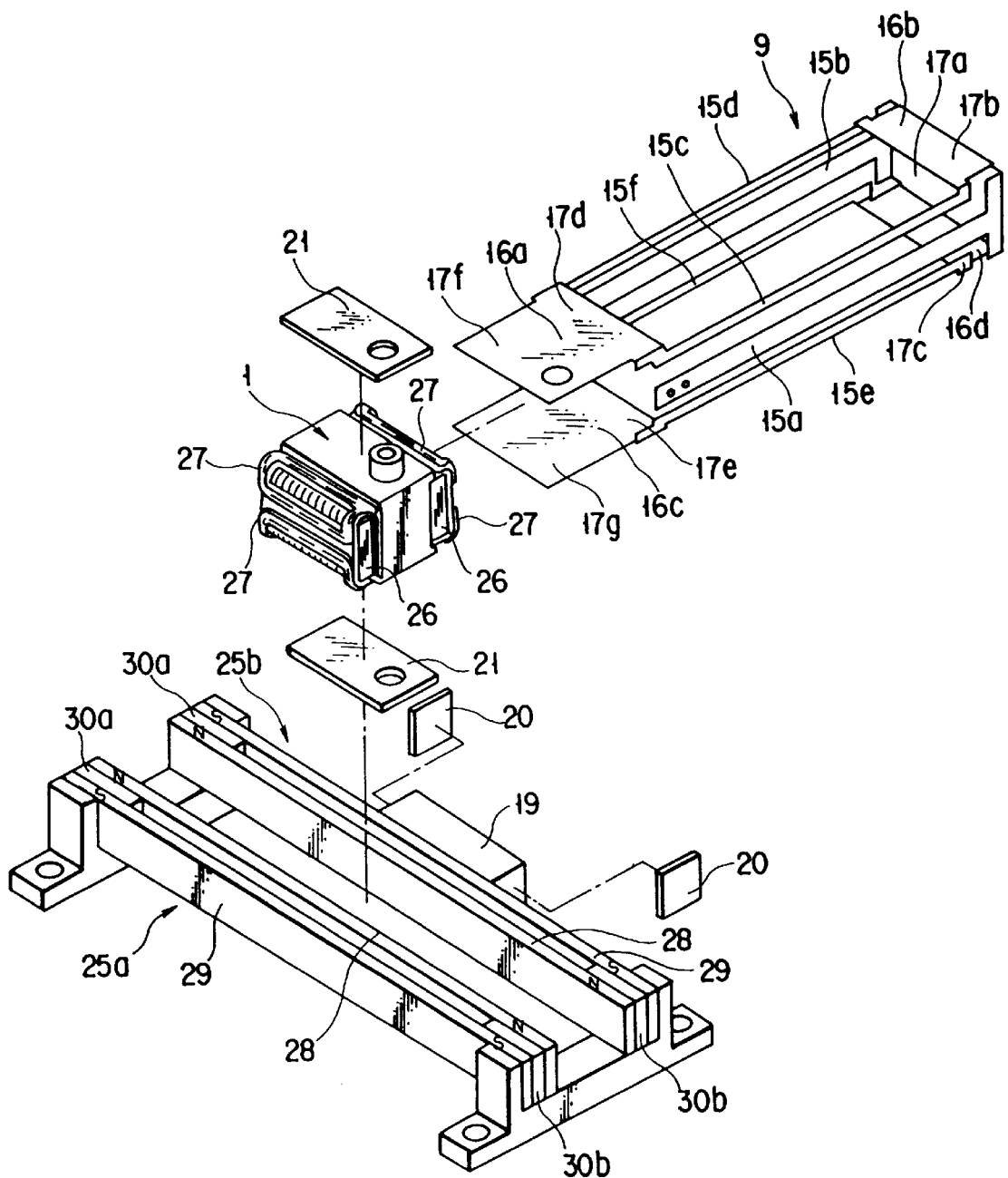
FIG. 11 is an exploded perspective view of the optical head drive device of FIG. 9.

FIG. 9 is a perspective view of an outline of an optical head drive device of a second embodiment of the present invention, FIG. 10 is a front view of FIG. 9, and FIG. 11 is an exploded perspective view of FIG. 9.

In the second embodiment, the drive mechanism for driving the optical head 1 comprises first and second drive sections 25*a* and 25*b*, which are provided on the right and left sides of the optical head 1.

Since the first and second drive sections 25*a* and 25*b* have the same structure, only the first drive section 25*a* will be explained. Regarding the second drive section 25*b*, the same reference numerals are added, and the explanation is omitted.

The movable section of the first drive section 25*a* comprises a rectangular tracking coil 26, which is fixed to the side surface of the optical head 1, and a focusing coil 27, which is fixed to the outer surface of the tracking coil 26.

On the fixing side of the first drive section 25*a*, there are formed an inner yoke 28 and an outer yoke 29 (magnet generating member). The inner and outer yokes 28 and 29 are formed to be opposite to each other to be parallel to the tracking direction T, and to have a predetermined gap therebetween. The inner yoke 28 is inserted to the tracking coil 26. As shown in FIG. 10, one side where drive force of the tracking coil 26 is generated and the focusing coil 27 are positioned in the gap between the inner and outer yokes 28 and 29.

Moreover, each of first and second magnets 30*a* and 30*b* is fixed to be sandwiched between the inner and outer yokes 28 and 29. The first and second magnets 30*a* and 30*b* restrain the gap between the yokes 28 and 29, and magnetize these yokes 28 and 29 to have a predetermined magnetism. In this embodiment, since the first and second magnets 30*a* and 30*b* are provided such the polarities N and S are directed in the same direction, the inner yoke 28 is magnetized to N, and the outer yoke 29 is magnetized to S.

Moreover, as shown in FIG. 10, a gap is formed among the yoke 28, the focusing coil 27, and the tracking coil 26 in the upper and lower directions. The size of the gap is set be more than the movable range of the optical head 1 in the focusing direction (0.6 mm in each of upper and lower directions). Even if the optical head 1 is driven upper and lower, these coils 27 and 26 are structured not to interface with the inner yoke 28.

Figure 12:
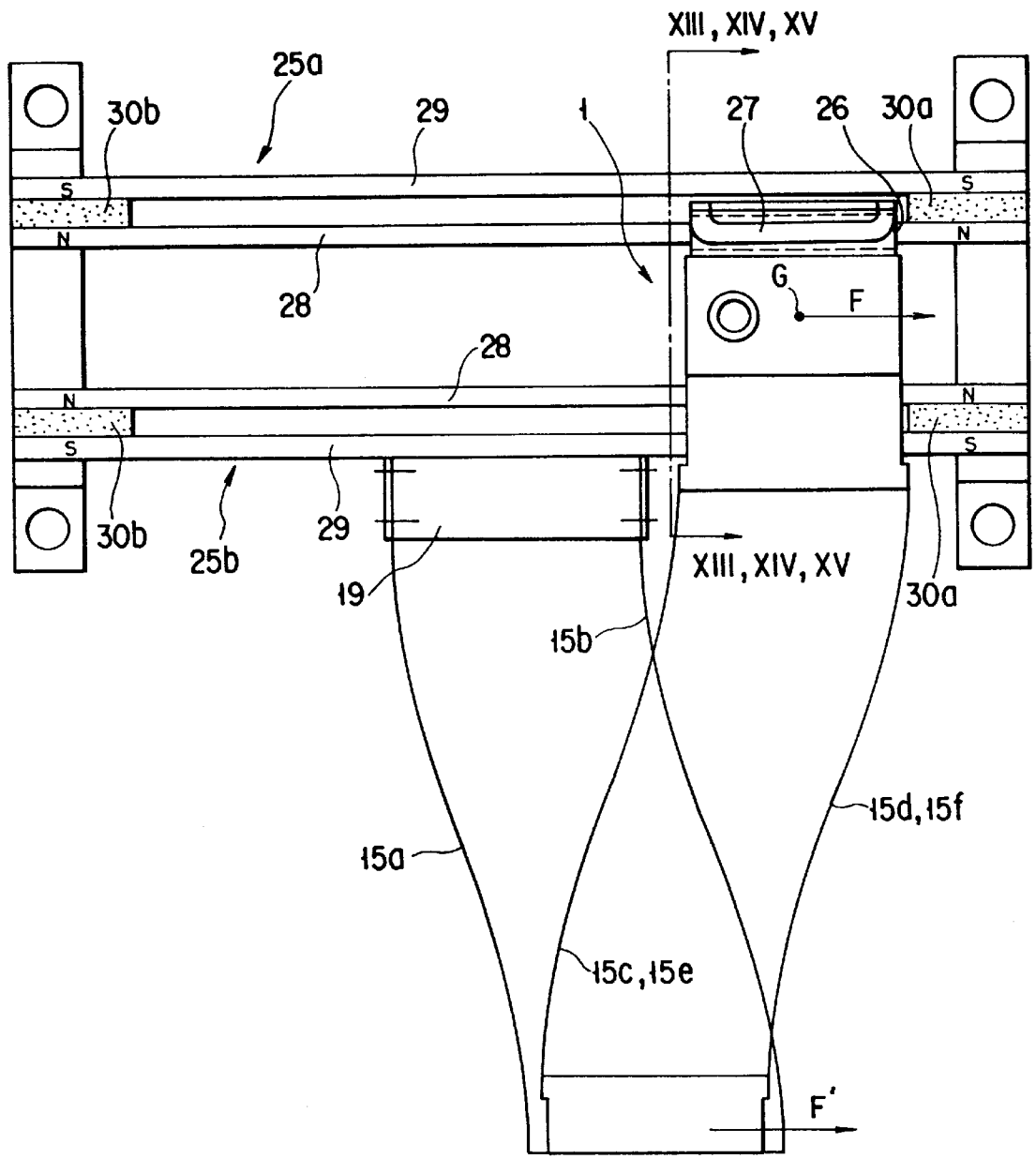
FIG. 12 is a schematic view showing an operation of the optical head drive device of FIG. 9.

According to the above-mentioned structure, the control current is supplied to the tracking coil 26 of the first and second drive mechanisms 25*a* and 25*b*, thereby the optical head 1 can be driven in the tracking direction as shown in FIG. 12. At this time, it is possible to prevent the optical head 1 from being shifted to the direction perpendicular to the tracking direction by the compound parallel leaf-spring mechanism 9.

Moreover, the control current is supplied to the focusing coil 27 of the first and second drive mechanisms 25*a* and 25*b*, thereby the optical head 1 can be driven in the focusing direction as shown in FIG. 12.

In this case, the balance of drive force to the tracking direction and that of drive force to the focusing direction are kept to be applied to the favorable drive force acting position G in order that force, which acts on the optical head 1 to be inclined, is not generated.

According to the above-mentioned structure of the second embodiment, there can be obtained substantially the same advantages as the first embodiment.

In the second embodiment, since the drive sections 25*a* and 25*b* are formed by the closed magnetic circuit, large magnetic flux can be obtained in the gap between the inner and outer yokes 28 and 29, and the driving sections 25*a* and 25*b* can be miniaturized.

Moreover, the optical head 1 is supported by two drive sections 25*a* and 25*b*, the position of the optical head 1 can be stabilized.

Figure 13A:
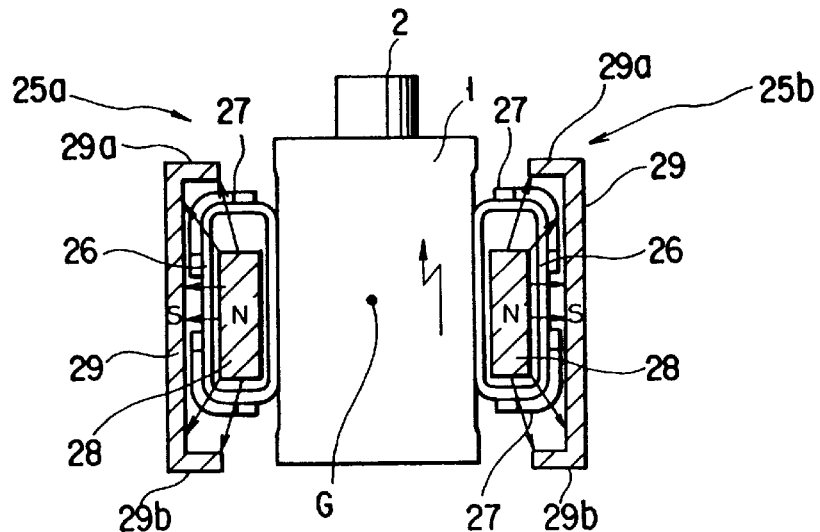
FIGS. 13A, 13B and 13C are process views of the driving operation of the optical head to a focusing direction in connection with an optical head drive device of a third embodiment of the present invention, and each of FIGS. 13A to 13C corresponds to the vertical cross section taken along a line XIII—XIII of the second embodiment of FIG. 12.
Figure 13B:
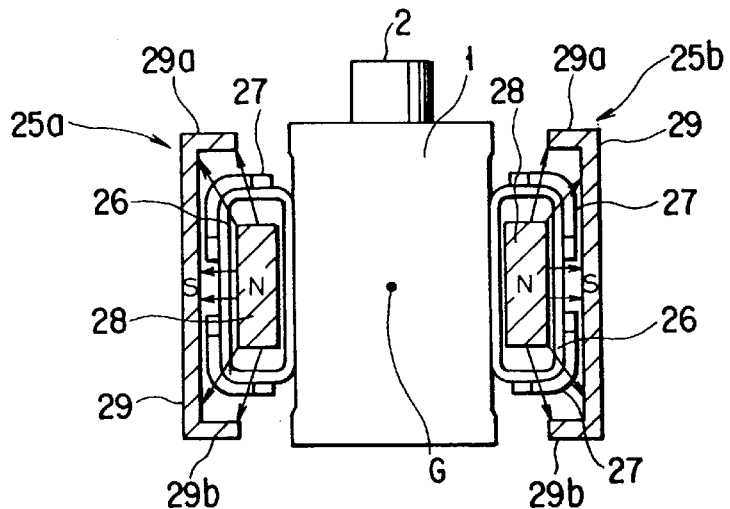
Figure 13C:
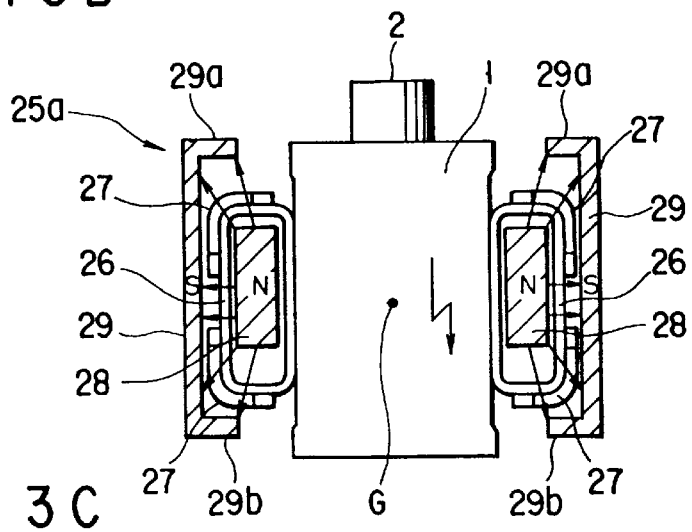

The following will explain a third embodiment of the present invention with reference to FIGS. 13A to 13C.

Similar to the second embodiment, the drive sections 25*a* and 25*b* are formed by the closed magnetic circuit, and the third embodiment has basically the same structure as the second embodiment. Due to this, the same reference numerals are added to the structural elements common to the second embodiment, and the explanation is omitted.

As shown in FIGS. 13A to 13C, in the third embodiment, upper and lower end portions 29a and 29b of the outer yoke 29 of the drive mechanisms 25a and 25b are extended much upper or lower than the upper and lower ends of the focusing coil 27 and the tracking coil 26.

FIG. 13A shows a state that the optical head 1 is displaced to the focusing direction where the optical head 1 approaches the recording medium at its maximum. FIG. 13B shows a state that the optical head 1 is placed at a neutral position. FIG. 13C shows a state that the optical head 1 is displaced to the direction where the optical head 1 is away from the recording medium at its maximum.

In these figures, arrows show magnetic flux directing to the outer yoke 29 from the inner yoke 28 of the driving sections 25a and 25b, that is, the magnetic flux supply area in the focusing direction, as seen from the tracking direction.

According to this embodiment, as shown in FIGS. 13A to 13C, in consideration of the movable range of the optical head 1 in the focusing direction, the upper and lower ends 29a and 29b of the outer yoke 29 are extended upper and lower, and the magnetic flux supply area completely encloses one side where tracking drive force is generated. In this case, one side where the tracking force is generated shows the portion seen from the tracking direction of the rectangular tracking coil 26.

Therefore, as shown in FIG. 13A or 13C, even if the optical head 1 is driven in the tracking direction in a state that the optical head 1 is moved to the focusing direction, drive force acting position of the case that the optical head 1 is driven in the tracking direction is substantially the same as the neutral case (FIG. 13A), that is, gravity position G seen from the disk tangential direction.

According to the above-mentioned structure, similar to the first embodiment, the optical head 1 can be effectively prevented from being inclined due to the torque when the optical head 1 is driven in the tracking direction.

The important point of this embodiment is that the cross section area of the inner yoke 28 and that of the outer yoke 29 are the same as each other seen from the tracking direction. Thereby, the magnetic resistance of the yoke 28 and that of the yoke 29 can be set to be the same, and the magnetic field can be equally generated between the yokes 28 and 29. This point can be applied to fourth and fifth embodiments to be explained later.

The following will explain the fourth and fifth embodiments of the present invention with reference to FIGS. 14A to 14C and 15A to 15C.

Figure 14A:
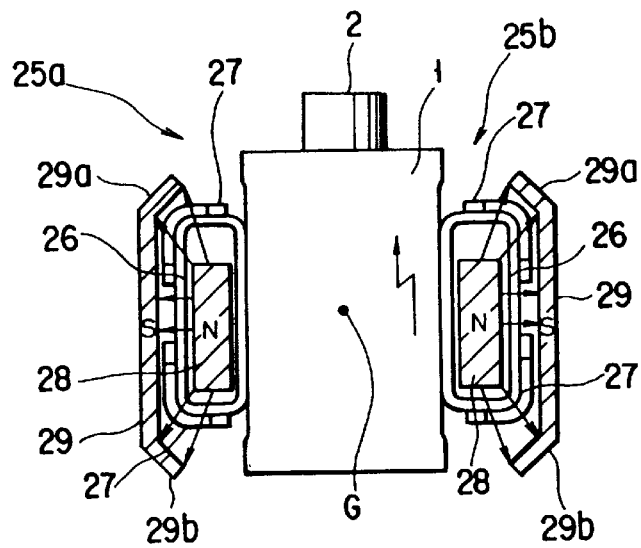
FIGS. 14A, 14B and 14C are process views of the driving operation of the optical head to a focusing direction in connection with an optical head drive device of a fourth embodiment of the present invention, and each of FIGS. 14A to 14C corresponds to the vertical cross section taken along a line XIV—XIV of the second embodiment of FIG. 12.
Figure 14B:
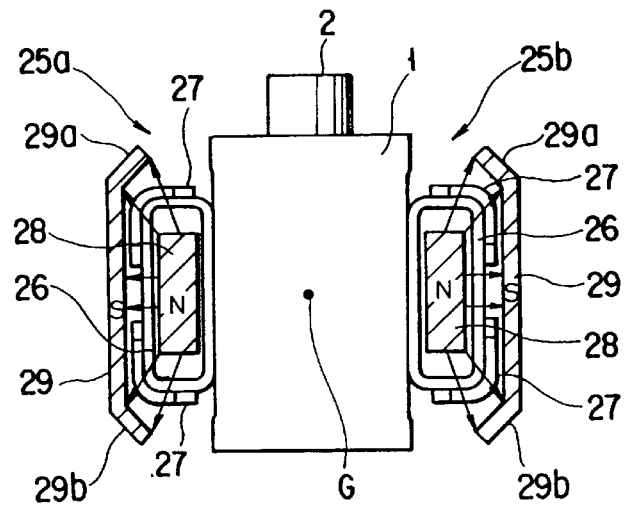
Figure 14C:
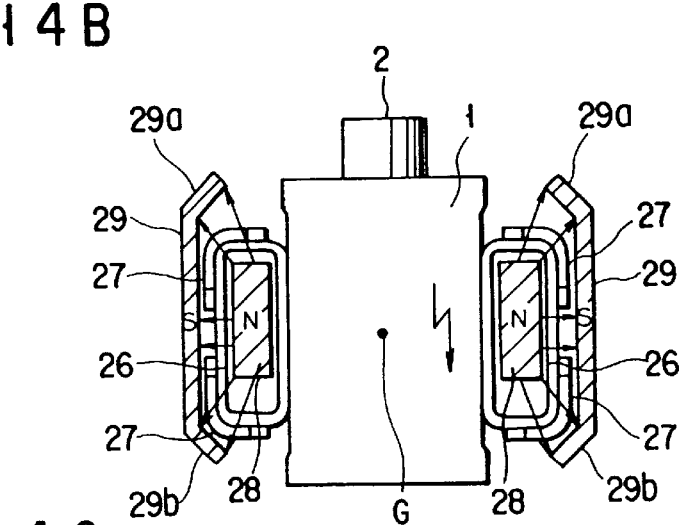

The main point of the fourth and fifth embodiments is the same as that of the third embodiment. More specifically, in the third embodiment, the upper end portion 29a of the outer yoke 29 and the lower end section 29b were bent substantially perpendicularly. In the fourth embodiment, as shown in FIGS. 14A to 14C, the upper end section 25a of the outer yoke 29 and the lower end section 25b are inclined inside at about 45°. In the fifth embodiment, these upper and lower end sections are expanded upward or downward without being bent as shown in FIGS. 15A to 15C.

Since one side where drive force of the tracking coil 26 is generated can be completely included in the magnetic flux supply area by the above-mentioned structure, the same advantage as the third embodiment can be obtained.

The present invention is not limited to the above-mentioned embodiments. The present invention can be variously modified without deviating from the feature of the present invention.

For example, in a case where a predetermined allowable value of the system design of the optical disk drive is set to a deterioration level of the readout signal, which is deteriorated by the positional shift of the optical head 1, the effective length and the spring constant of each of the first and second tracking leaf-spring members 15a, 15b, and 15c to 15f may be arbitrarily set within the allowable value. In other words, even if the effective length and the spring constant of each of the spring members slightly differ, the deterioration level of the readout signal may be set to be in the predetermined allowable value.

Moreover, in the above-mentioned embodiment, the compound parallel leaf-spring mechanism 9 was formed by bending one steel material for the leaf-spring. However, the coupling leaf spring member 17a may be engineering plastic. Also, other coupling leaf spring members 17b to 17g may be formed of engineering plastic.

Moreover, the optical head 1 may be formed of engineering plastic having high rigidity and low linear expansion so as to be firmly secured to the coupling leaf-spring members 4f and 4g as one unit by an injection mold. Or, the compound parallel leaf-spring mechanism fixing member 19 may be formed of engineering plastic having high rigidity and low linear expansion so as to be firmly secured to the receptive one end sides of the tracking leaf-spring sections 15a and 15b as one unit by an injection mold.

Furthermore, the optical head of the above-mentioned embodiments was the optical system combination type of head comprising the objective lens, the semiconductor laser element, serving as a light source, the optical elements such as the collimator lens, the beam splitter, the prism, and the hologram, and the photo detector. However, there may be used the optical head of the optical system separation type in which the movable section including the objective lens and the fixing optical system are separated.

Even by the above-mentioned structure, the position of the movable section (objective lens) can be prevented from being shifted to the direction perpendicular to the tracking direction. Due to this, it is unnecessary to provide the mechanism for correcting the light beam from the fixing optical system, and the generation of azimuth can be prevented. Therefore, according to the present invention, as compared with the conventional case, the structure can be more simplified and reproducing and recording accuracy can be improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head driving device driving an objective lens of the optical bead to a recording medium and providing irradiation of a light beam to the recording medium to execute at least data signal recording and reproducing, comprising:

a movable section for holding at least said objective lens;

a drive mechanism for driving said movable section by electromagnetic force; and a compound parallel leaf-spring mechanism for movably holding said movable section in a driving direction of said drive mechanism and having a pair of first tracking spring members and a pair of second tracking spring members, wherein said pair of first tracking spring members is provided in a tracking direction of said objective lens to have a predetermined distance, each member of said pair of first tracking spring members has one end side and an other side, and said each member of said pair of first tracking spring members is such that one end side is fixed, and the other end side is elastically deformable to the tracking direction on a basis of said one end side as a base end, said pair of second tracking spring members is provided in the tracking direction of said objective lens to have a predetermined distance, each member of said pair of second tracking spring members has one end side and an other end side, said second tracking spring members have substantially the same effective spring length and spring constant as said first tracking spring members, and said each member of said second tracking spring members is structured such that each one end side is coupled to said movable section, and the other end is coupled to said other end side of said first tracking spring member so as to be elastically deformable to the tracking direction, said drive mechanism comprises a tracking coil in said movable section for driving said movable section in the tracking direction, a focusing coil in said movable section for driving said movable section in a focusing direction, and a pair of magnetism generating members sandwiching said tracking coil and said focusing coil therebetween to have a predetermined space, said pair of magnetism generating members of said driving mechanism is structured such that an N polarity and an S polarity are provided to be opposite to each other to form a closed magnetic circuit, said tracking coil is cylindrically formed, said pair of magnetism generating members comprises one yoke provided along said tracking direction and inserted into said tracking coil, an other yoke provided parallel to and sandwiching one side where a tracking force is generated between said one yoke and said other yoke from said tracking direction of said cylindrical tracking coil, and magnet members sandwiched between both longitudinal ends of sad one yoke and said other yoke, with a portion of said focusing coil in a substantially same plane as said magnet members respective said magnet members are provided such that N and S polarities are provided in a same direction and said one yoke and said other yoke are magnetized to have a different polarity.

2. The device according to claim 1, wherein said driving mechanism is provided on right and left sides of the tracking direction of said movable section.

3. The device according to claim 1, wherein said pair of magnetism generating members of said driving mechanism are structured such that a magnetic flux supply area of the focusing direction completely includes one side where the tracking drive force is generated from the tracking direction of said tracking coil in a movable range of said movable section in the focusing direction.

4. The device according to claim 1, wherein said one yoke and said other yoke have substantially equal cross sectional areas as seen from the tracking direction.

5. The device according to claim 1, wherein said compound parallel leaf-spring mechanism has coupling members for coupling the other ends of said first tracking spring members to each other and for coupling the other ends of said second tracking spring members to each other.

6. The device according to claim 1, wherein said pair of second tracking spring members of said compound parallel leaf-spring mechanism have one spring member and an other spring member to sandwich respective first tracking leaf spring members of said pair of first tracking spring members therebetween in the focusing direction.

7. The device according to claim 6, wherein said compound parallel leaf-spring mechanism has a pair of first focusing spring members on one end side and the other end side of one spring member of said second tracking spring members such that one end side of one spring member is connected to said movable section and the other end side is connected to the first tracking spring member, and a pair of second focusing spring members on one end side and the other end side of the other spring member of said second tracking spring members, having substantially the same spring effective length and spring constant as the first focusing spring members, such that one end side of the other spring member is connected to said movable section and the other end side is connected to said tracking spring member.

8. The device according to claim 7, wherein said compound parallel leaf-spring mechanism has a first coupling member for coupling the other end sections of said pair of first tracking spring members to each other, and for coupling these other end sections to one first focusing spring member connected to the other end section of one spring member of said second tracking spring member and one second focusing spring member connected to the other end section of the other spring member;

a second coupling member for coupling the other end sections of one spring member of said pair of second tracking spring members to each other, and for coupling these other end sections to one focusing spring member;

a third coupling member for coupling the other end sections of the other spring member of said pair of second tracking spring members to each other, and for coupling these other end sections to one focusing spring member;

a fourth coupling member for coupling one end sections of the other spring member of said pair of second tracking spring members to each other, and for coupling these one end section to the other first focusing spring member; and a fifth coupling member for coupling one end sections of the other spring member of said pair of second tracking spring members to each other, and for coupling these one end sections to the other second focusing spring member.

9. The device according to claim 7, wherein said compound parallel leaf springs mechanism is structured such that all members are formed of one spring plate material.

10. The device according to claim 1, wherein said pair of first and second tracking spring members have the same effective spring length and a spring constant.

11. The device according to claim 1, wherein said pair of first and second tracking spring members are structured to be elastically deformable to the tracking direction by an amount obtained when said optical head is driven over the entire recording area on said recording medium in the tracking direction.

* * * * *